(12) United States Patent
Zhang et al.

(10) Patent No.: US 11,882,833 B2
(45) Date of Patent: Jan. 30, 2024

(54) WOOD PRESERVATIVE AND METHOD FOR PRODUCING SAME

(71) Applicant: Koppers Performance Chemicals Inc., Pittsburgh, PA (US)

(72) Inventors: Jun Zhang, Peachtree City, GA (US); Peter Tham, Morrow, GA (US); John Horton, Peachtree City, GA (US)

(73) Assignee: Koppers Performance Chemicals Inc., Pittsburgh, PA (US)

( * ) Notice: Subject to any disclaimer, the term of this patent is extended or adjusted under 35 U.S.C. 154(b) by 0 days.

(21) Appl. No.: 17/479,503

(22) Filed: Sep. 20, 2021

(65) Prior Publication Data

US 2022/0000115 A1 Jan. 6, 2022

Related U.S. Application Data

(60) Continuation of application No. 16/216,486, filed on Dec. 11, 2018, now Pat. No. 11,140,901, which is a division of application No. 15/840,877, filed on Dec. 13, 2017, now abandoned.

(60) Provisional application No. 62/437,372, filed on Dec. 21, 2016, provisional application No. 62/435,504, filed on Dec. 16, 2016.

(51) Int. Cl.
| | |
|---|---|
| *A01N 43/56* | (2006.01) |
| *B27K 3/22* | (2006.01) |
| *B27K 3/52* | (2006.01) |
| *B27K 5/00* | (2006.01) |
| *B27K 3/00* | (2006.01) |
| *B27K 3/02* | (2006.01) |
| *B27K 3/34* | (2006.01) |
| *A01N 25/04* | (2006.01) |
| *A01N 59/20* | (2006.01) |
| *B27K 3/08* | (2006.01) |
| *B27K 3/42* | (2006.01) |
| *B27K 3/38* | (2006.01) |
| *B27K 3/20* | (2006.01) |
| *B27K 3/30* | (2006.01) |
| *B27K 3/16* | (2006.01) |

(52) U.S. Cl.
CPC ............. *A01N 43/56* (2013.01); *A01N 25/04* (2013.01); *A01N 59/20* (2013.01); *B27K 3/005* (2013.01); *B27K 3/007* (2013.01); *B27K 3/0207* (2013.01); *B27K 3/08* (2013.01); *B27K 3/22* (2013.01); *B27K 3/343* (2013.01); *B27K 3/38* (2013.01); *B27K 3/42* (2013.01); *B27K 3/52* (2013.01); *B27K 5/0055* (2013.01); *B27K 3/163* (2013.01); *B27K 3/20* (2013.01); *B27K 3/30* (2013.01); *B27K 2240/20* (2013.01)

(58) Field of Classification Search
None
See application file for complete search history.

(56) References Cited

U.S. PATENT DOCUMENTS

| 4,404,169 | A | 9/1983 | Ploss et al. |
|---|---|---|---|
| 4,808,406 | A | 2/1989 | Brinkman |
| 5,145,684 | A | 9/1992 | Liversidge et al. |
| 5,763,364 | A | 6/1998 | Frisch et al. |
| 7,426,948 | B2 | 9/2008 | Richardson et al. |
| 2001/0006684 | A1 | 7/2001 | Goettsche et al. |
| 2005/0118280 | A1 | 6/2005 | Leach et al. |
| 2006/0075923 | A1 | 4/2006 | Richardson |
| 2014/0079806 | A1 | 3/2014 | Koop et al. |
| 2014/0088041 | A1 | 3/2014 | Koop et al. |
| 2014/0171312 | A1 | 6/2014 | Lo et al. |
| 2014/0242137 | A1 | 8/2014 | Maynard |
| 2015/0031447 | A1 | 1/2015 | Walker et al. |
| 2015/0104487 | A1 | 4/2015 | Maier et al. |
| 2015/0314471 | A1 | 11/2015 | Thompson et al. |
| 2016/0295863 | A1 | 10/2016 | Koop et al. |
| 2018/0213798 | A1 | 8/2018 | Hirotomi et al. |
| 2018/0235222 | A1 | 8/2018 | Uhr et al. |
| 2018/0242588 | A1* | 8/2018 | Uhr .................... B27K 3/163 |
| 2019/0084182 | A1 | 3/2019 | Zhang et al. |
| 2019/0184597 | A1 | 6/2019 | Zhang et al. |

FOREIGN PATENT DOCUMENTS

| JP | 2008522878 | | 7/2008 |
|---|---|---|---|
| JP | 2013516436 | | 5/2013 |
| JP | 2013544800 | | 12/2013 |
| JP | 2018527352 | | 9/2018 |
| JP | 2020502093 | | 1/2020 |
| WO | 2004011215 | A2 | 2/2004 |
| WO | 2004091875 | A2 | 10/2004 |
| WO | 2006044218 | A2 | 4/2006 |
| WO | 2006047126 | A2 | 5/2006 |
| WO | 2017037118 | A1 | 3/2017 |

OTHER PUBLICATIONS

Kull et al. "Mixtures of Quaternary Ammonium Compounds and Long-chain Fatty Acids as Antifungal Agents", Applied Microbiology, vol. 9, Apr. 17, 1961, pp. 538-541.

* cited by examiner

*Primary Examiner* — Scott R. Walshon
(74) *Attorney, Agent, or Firm* — K&L Gates LLP

(57) ABSTRACT

A synergistic aqueous wood preservative composition comprising a copper compound and penflufen. The copper compounds of the compositions of the invention may be soluble, partially solubilized or micronized particles. The penflufen of the compositions of the invention may be solubilized, emulsified or particulate. The wood preservative compositions of the present invention are surprisingly provided as stable dispersions and confer surprising and unexpected resistance to treated wood and wood products.

22 Claims, No Drawings

WOOD PRESERVATIVE AND METHOD FOR PRODUCING SAME

This application is a continuation application of U.S. patent application Ser. No. 16/216,486, filed Dec. 11, 2018, which is a divisional of U.S. patent application Ser. No. 15/840,877, filed Dec. 13, 2017, which claims priority to U.S. Provisional Application No. 62/435,504 filed Dec. 16, 2016, and U.S. Provisional Application No. 62/437,372 filed Dec. 21, 2016, each of which is incorporated by reference in its entirety herein.

FIELD OF THE INVENTION

The present invention relates to biocidal compositions, particularly wood preservative compositions comprising one or more copper compounds and penflufen. More particularly, the invention relates to a method of manufacture of particulate-based biocidal compositions capable of being injected into wood, the biocidal compositions, methods of preserving wood using the compositions, and wood treated with the compositions of this invention.

BACKGROUND OF THE INVENTION

Copper compounds are common biocides for the protection of wood or wood products from fungal decay. Compositions comprising copper compounds alone, however, cannot be used as wood preservative treatments because the presence of copper-tolerant fungi in wood prevents such compositions from being effective.

The prior art discloses a variety of pyrazole-based organic biocides. For example, in U.S. patent application Ser. No. 13/880,619, Pub. No. US2014/0079806, penflufen was disclosed as a fungicide for the treatment of wood against basidiomycetes. However, some fungi are tolerant of pyrazole fungicides.

Different approaches to the problem of fungal tolerance have been reported. For example, in U.S. patent application Ser. No. 13/880,985, Pub. No. US2014/0088041, penflufen mixtures were disclosed as fungicides for the protection of industrial materials. In U.S. patent application Ser. No. 15/177,845, Pub. No. US2016/0295863, penflufen mixtures were also disclosed as fungicides for the protection of industrial materials.

The inventors have surprisingly discovered that wood preservative compositions comprising particles of one or more copper compound and penflufen effectively prevent fungal decay in treated wood or wood products. Also surprisingly, the inventors have discovered that the wood preservative compositions comprising one or more copper compounds and penflufen exhibit a synergistic effect in resisting decay of sapwood species of wood by brown rot fungi.

The inventors have also surprisingly discovered a method of making wood preservative compositions comprising micronized particles of one or more copper compounds and penflufen. Compositions comprising micronized particles frequently suffer from aggregation or other morphological instability, but the wood preservative compositions produced according to the present invention are surprisingly stable under storage conditions.

SUMMARY OF THE INVENTION

When either a copper compound or a pyrazole fungicide is used alone as a wood preservative composition, only certain wood decay fungi may be controlled. It was surprisingly found that a copper compound in combination with penflufen provided synergistic, broad spectrum control.

In certain embodiments, the invention is directed to methods of treating wood or a wood product comprising a step of contacting the wood or wood product with an aqueous wood preservative composition, which exhibits a synergistic effect in resisting fungal decay. The aqueous wood preservative composition itself comprises an aqueous carrier, a copper compound and penflufen in a copper: penflufen ratio of between about 1:1 to about 500:1. In other embodiments, the invention is directed to the wood preservative composition itself.

In certain embodiments, the aqueous wood preservative composition comprises a micronized copper compound. In a preferred embodiment, the micronized copper compound has a particle size of 5 to 5000 nanometers.

In certain embodiments, the aqueous wood preservative composition comprises penflufen. In a preferred embodiment, penflufen is in a micronized form and the micronized penflufen has a particle size of 5 to 5000 nanometers. In another preferred embodiment, penflufen is either solubilized, emulsified or encapsulated in a polymer matrix.

In certain embodiments, the aqueous wood preservative composition comprises both a micronized copper compound and penflufen. In one embodiment, the aqueous wood preservative composition comprises both a micronized copper compound and emulsified penflufen. In another embodiment, the aqueous wood preservative composition comprises both a micronized copper compound and micronized penflufen. In a preferred embodiment, the micronized copper compound and/or the micronized penflufen has a particle size of 5 to 5000 nanometers. In another preferred embodiment, the particle size of the micronized copper compound and/or the micronized penflufen varies by less than 50 nanometers after storage from week one to 6 months at 24° C. In another preferred embodiment, the present wood preservative composition can further be used in combination with other known preservative chemicals, including boron based preservatives, such as boric acid, sodium salt of borates; triazole compounds, pentachlorophenol, and sodium fluoride. Triazoles of the wood preservative formulations of the invention include, but are not limited to epoxiconazole, triadimenol, propiconazole, prothioconazole, metconazole, cyproconazole, tebuconazole, flusilazole, paclobutrazol, fluconazole, isavuconazole, itraconazole, voriconazole, pramiconazole, ravuconazole, and posaconazole.

In certain embodiments, the aqueous wood preservative composition comprises a solubilized copper compound. In other embodiments, the aqueous wood preservative composition used in the claimed method of treating wood or a wood product comprises emulsified penflufen or soluble penflufen. In another preferred embodiment, the present composition can further comprise a boron compound, such as boric acid, sodium salt of borates; a triazole compound, or pentachlorophenol. Triazoles of the wood preservative formulations of the invention include, but are not limited to epoxiconazole, triadimenol, propiconazole, prothioconazole, metconazole, cyproconazole, tebuconazole, flusilazole, paclobutrazol, fluconazole, isavuconazole, itraconazole, voriconazole, pramiconazole, ravuconazole, and posaconazole.

In certain embodiments, the invention is direct to methods of treating wood or a wood product comprising a step of contacting the wood or wood product with an aqueous wood preservative composition, as described above. The treated wood or wood product in this embodiment retains penflufen in an amount between about 4 to 200 g/m$^3$. In a preferred embodiment, the treated wood or wood product in this embodiment retains penflufen in an amount between about 8 to 100 g/m$^3$ and in a more preferred embodiment in an amount between about 8 to 80 g/m$^3$.

In certain embodiments, the aqueous wood preservative composition, applied to achieve a retention in an amount between about 4 to 200 g/m$^3$, resists decay of sapwood species of wood by brown rot fungi in a soil-block test according to American Wood Protection Association Standard E10-2015, such that the treated wood or wood product loses between less than 2% and 20% mean weight. In certain embodiments, the brown rot fungi are selected from the group consisting of *Gloeophyllum trabeum, Fibroporia radiculosa, Postia placenta* and *Coniophora Postia puteana*. In certain embodiments, the sapwood species is southern yellow pine.

In certain embodiments, the invention is directed to wood or a wood product comprising a copper compound and penflufen, wherein the copper:penflufen ratio is between about 1:1 to about 500:1 and wherein the wood or wood product contains the penflufen in an amount between about 4 to 200 g/m$^3$. In a preferred embodiment, the invention is directed to wood or a wood product comprising a copper compound and penflufen, wherein the copper:penflufen ratio is between about 1:1 to about 500:1 and wherein the wood or wood product contains the penflufen in an amount between about 8 to 80 g/m$^3$.

A stable micronized penflufen particle dispersion may be prepared through a milling process. In one embodiment, the milling process comprises the step of mixing a slurry of penflufen and dispersant mixture in a solvent, and wet milling of the slurry with a high density grinding media having a diameter between 0.05 mm and 1.0 mm, preferably between 0.1 mm to 0.5 mm, and a density of 2.5 g/cc or higher, preferably 3.5 g/cc or higher. The milled penflufen dispersion has a particle size in the range of 5 nanometers to 5000 nanometers (5 microns), specifically with a size of $d_{95}$ of about 5 microns or less and a $d_{50}$ of greater than 20 nanometers (0.02 microns).

In certain embodiments, the dispersant used in the milling is a polymeric dispersant. In a preferred embodiment, the dispersant is a salt of naphthalene sulfonate condensate, or a salt of sulfonated naphthaleneformaldehyde condensate, or sulfonated naphthalene formaldehyde polymer admixture. In certain embodiments, the weight ratio of the penflufen to the dispersant varies from 1:10 to about 1000:1, and preferred ratio is about 1:1 to about 100:1.

The prepared micronized penflufen compositions are stable under high-shear mixing and subject to multiple pressure treatments. In addition, the milled penflufen particles can be mixed with compositions containing copper compounds and the mixture of penflufen/copper is also stable under high shear mixing and subject to multiple pressure treatment. Upon storage, the mean particle size, the $d_{95}$ and the $d_{50}$ of the prepared penflufen compositions remain stable from the first month to the sixth month.

DETAILED DESCRIPTION OF THE INVENTION

Unless otherwise specified, all compositions are given in "percent", where the percent is the percent by weight based on the total weight of the entire component, e.g., of the particle, or to the injectable composition. In the event a composition is defined in "parts" of various components, this is parts by weight wherein the total number of parts in the composition is between 90 and 110.

As used herein, the term "resistant to fungal decay" indicates that the wood or wood product is suitable for use in residential construction under relevant building codes. As used herein, the term "stable" used in reference to a wood preservative composition means that wood can be pressure treated with the "stable" composition without fallout on the surface of the wood.

As used herein, the term "micronized" refers to particulate material that has been milled to a relatively small particle size. Thus, a micronized compound is also a dispersed or particulate compound. The term "micronized" is not intended to indicate a specific particle size or range of particle sizes, although the micronized particles of the present invention tend to have particle sizes less than 10 μm in diameter.

As used herein, particle diameters may be expressed as "$d_{xx}$" where the "xx" is the weight percent (or alternately the volume percent) of that component having a diameter equal to or less than the $d_{xx}$. The $d_{50}$ is the diameter where 50% by weight of the component is in particles having diameters equal to or lower than the $d_{50}$, while just under 50% of the weight of the component is present in particles having a diameter greater than the $d_{50}$. Particle diameter is preferably determined by Stokes Law settling velocities of particles in a fluid, for example with a Model LA 700 or a CAPA™ 700 sold by Horiba and Co. Ltd., or a Sedigraph™ 5100T manufactured by Micromeritics, Inc., which uses x-ray detection and bases calculations of size on Stoke's Law, to a size down to about 0.2 microns. Smaller sizes are preferably determined by a dynamic light scattering method, preferably with a Coulter™ counter.

Generally, the copper or copper compounds of the present invention are prepared from: but are not limited to copper metal, cuprous oxide (a source of copper (I) ions), cupric oxide (a source of copper (II) ions), copper hydroxide, copper carbonate, basic copper carbonate, copper oxychloride, copper 8-hydroxyquinolate, copper dimethyldithiocarbamate, copper omadine, copper borate or basic copper borates, copper residues (copper metal byproducts) or any suitable copper source. Copper compounds disclosed in the current invention can be either particulate copper dispersion or soluble copper solution. In the case of particulate copper dispersion, copper compounds are dispersed with an aid of polymeric dispersant(s). In the case of soluble copper solution, copper compounds may be solubilized by contacting them with a solubilizing agent. Examples of solubilizing agents include, but are not limited to, alkanolamines, such as, for example, monoethanolamine, ethanolamine, diethanolamine, triethanolamine and ammonia. In one embodiment, copper compounds are prepared in a micronized dispersion.

In another embodiment, the particles comprise at least about 20%, 30%, 40%, 50%, 60%, 70% or 75% of the weight of the any of these copper compounds. The most preferred copper compounds are copper hydroxide and basis copper carbonate.

In certain embodiments, the aqueous wood preservative composition comprises one or more copper compound and penflufen, where the copper compound can be either micronized or amine solubilized. In one embodiment, the aqueous wood preservative composition comprises a solubilized copper compound and emulsified penflufen. In another embodiment, the aqueous wood preservative composition comprises a micronized copper compound and emulsified penflufen. In another embodiment, the aqueous wood preservative composition comprises both a micronized copper compound and micronized penflufen. In a preferred embodiment, the micronized copper compound and/or the micronized penflufen has a particle size of 5 to 5000 nanometers. In another embodiment, wood or a wood product is impregnated with dispersed particles of one or more copper compounds and dispersed penflufen particles, which comprise the biocidal compositions of the invention.

In one embodiment, the dispersants used in the wood-preservative compositions of the present invention include, but are not limited to cationic, non-ionic or anionic dispersants, acrylic copolymers, an aqueous solution of copolymers with pigment affinity groups, polycarboxylate ethers, modified polyacrylates, acrylic polymer emulsions, modified acrylic polymers, poly carboxylic acid polymers and their salts, modified poly carboxylic acid polymers and their salts, fatty acid modified polyesters, aliphatic polyethers or modified aliphatic polyethers, polyetherphosphates, solution of polycarboxylate ethers, sodium polyacrylates, sodium polymethacrylates, modified polyether or polyester with pigment affinity groups, fatty acid derivatives, urethane copolymers or modified urethane copolymers, acrylic acid/maleic acid copolymers, polyvinyl pyrrolidones or modified polyvinyl pyrrolidones, modified maleic anhydride/styrene copolymers, lignins and the like.

Preferably, the dispersants used in the wood-preservative compositions of the present invention are polymeric dispersants. In one embodiment, the polymeric dispersants contain at least one pigment affinity group capable of binding to a solid particle. In another embodiment, the polymeric dispersants stabilize a solid particle. Preferably, the polymeric dispersants used in the wood-preservative compositions of the present invention are modified polycarboxylate ethers, modified poly carboxylic acid polymers and their salts, solutions of polycarboxylate ethers and modified polyethers or polyesters with pigment affinity groups.

In a first embodiment of the invention, the dispersant is a non-ionic surfactant. Non-ionic surfactants are materials which carry no discrete charge when dissolved or suspended in aqueous media. The hydrophilicity of the surfactant is provided by hydrogen bonding with water molecules. Oxygen atoms and hydroxyl groups readily form strong hydrogen bonds. Such hydrogen bonding can provide a dispersion (suspensibility) or solubilization of the fungicide in neutral or alkaline media. Non-ionic materials useful for the present invention further include polyalkylene oxide block copolymers. Such block copolymers typically have at least one block segment comprising -$(AO)_x$-, wherein AO represents an oxyalkylene moiety and x is a number of about 1 to about 100. Preferably, AO represents either an ethylene oxide moiety or a propylene oxide moiety. The -$(AO)_x$-block must be attached to a functional group differing in hydrophilicity (or hydrophobicity).

Exemplary surfactants/dispersants include ethoxylates of castor oil (ethyleneoxide degree of polymerization 30 60 ethoxy moieties); ethoxylates of tridecylalcohol(ethyleneoxide degree of polymerization 4 20); ethoxylates of a C10 C14 alcohol (ethyleneoxide degree of polymerization 4 20); ethoxylates of nonylphenol (ethyleneoxide degree of polymerization 6 50); ethoxylates of a fatty alcohol (ethyleneoxide degree of polymerization 3 20); ethoxylates of a sorbitol ester (ethyleneoxide degree of polymerization 10 40); ethoxylates of a sorbitan-tallate (ethyleneoxide degree of polymerization 10 40); ethoxylates of a tristyrphenol (ethyleneoxide degree of polymerization 3 20); ethoxylates of a isodecyl alcohol (ethyleneoxide degree of polymerization 3 10); ethoxylates of a isododecyl alcohol (ethyleneoxide degree of polymerization 3 10), or mixtures thereof.

A group of non-ionic surfactants useful in the context of the present invention includes a polycondensation product containing an alkylene glycol as a monomer. Exemplary compounds include a polyethylene glycol, a polypropylene glycol or a block polymer of ethylene glycol and propylene glycol. The degree of polymerization of these compounds is preferably in the range of about 5 to about 1,000, and more preferably in the range of from about 10 to about 500.

Non-ionic dispersants further include polyalkylene oxide block copolymers. Such block copolymers typically have at least one block segment comprising -$(AO)_x$-, wherein AO represents an oxyalkylene moiety and x is a number of about 1 to about 100. Preferably, AO represents either an ethylene oxide moiety or a propylene oxide moiety. The -$(AO)_x$-block must be attached to a functional group differing in hydrophilicity (or hydrophobicity). Such copolymers can be derived from higher alkylene oxides such as ethylene oxide, propylene oxide, butylene oxide, styrene oxide, etc. Such block copolymers typically contain a polyethylene oxide block which is relatively hydrophilic combined with another polyalkylene oxide block which is typically hydrophobic resulting in surfactant properties. Another non-ionic surfactant includes polyoxypropylene-polyoxyethylene block copolymer surfactants. Those surfactants comprising a center block of polyoxypropylene units (PO), and having a block of polyoxyethylene (EO) units to each side of the center PO block, are generally useful in the context of this invention, particularly where the average molecular weight ranges from about 900 to 14,000, and the percent of weight EO ranges from about 10 to 80. These types of surfactants are sold commercially as "Pluronics."

A second, and preferred, group of non-ionic surfactants useful in the context of the present invention includes etherified compound of the first group of compounds and an aliphatic alcohol. In such a manner, a dispersant having a polyethylene oxide block which is relatively hydrophilic combined with a long alkyl section, e.g., $C_6$ to $C_{30}$, which is typically hydrophobic can be obtained, resulting in surfactant properties. Exemplary compounds include polyethylene glycol oleyl ether (ethyleneoxide degree of polymerization 4 to 50), polyethylene glycol cetyl ether (ethyleneoxide degree of polymerization 4 to 50), polyethylene glycol stearyl ether (ethyleneoxide degree of polymerization 4 to 50), polyethylene glycol lauryl ether (ethyleneoxide degree of polymerization 4 to 50), polyethylene glycol tridecyl ether (ethyleneoxide degree of polymerization 4 to 50), polyethylene glycol nonylphenyl ether (ethyleneoxide degree of polymerization 4 to 50), polyethylene glycol octylphenyl ether (ethyleneoxide degree of polymerization 4 to 50), and the like. A preferred degree of polymerization for compounds in this class is in the range of from 4 to 20, for example between about 6 to about 12.

A subgroup of compounds is an etherified compound of the above-mentioned group of compounds and a higher fatty acid. Exemplary compounds include polyethylene glycol monolaurate (ethyleneoxide degree of polymerization 2 to 50), polyethylene glycol monostearate (ethyleneoxide degree of polymerization 2 to 50), polyethylene glycol monooleate (ethyleneoxide degree of polymerization 2 to 50), and the like.

Other non-ionic surfactants include polyoxypropylene-polyoxyethylene block copolymer surfactants. Those surfactants comprising a center block of polyoxypropylene units (PO), and having a block of polyoxyethylene (EO) units to each side of the center PO block, are generally useful in the context of this invention, particularly where the average molecular weight ranges from about 900 to 14,000, and the percent of weight EO ranges from about 10 to 80.

In addition, hydrophobically modified pluronic surfactants can be employed, wherein a modifying group (R) such as a methyl, ethyl, propyl, butyl, benzyl, etc. may be capping the terminal oxy alkaline group; e.g., R-(EO)$_n$(PO)$_m$-(EO)$_n$R.

Exemplary dispersants include linear alcohol alkoxylates, such as the linear alcohol ethoxylates or an ethyoxylated/propoxylated block. If desired, the alcohol alkoxylate is suitably end-capped with a lower alkyl group, and such a product is commercially available as POLY-TERGENT SLF-18 surfactant, available from BASF Corporation. Other useful anionics are polycarboxylated alcohol alkoxylates, preferably those selected from the group consisting of the acids or organic or inorganic salts of the following: polycarboxylated linear alcohol alkoxylates, polycarboxylated branched alcohol alkoxylates, polycarboxylated cyclic alcohol alkoxylates, and combinations thereof. Nonionic surfactants include, for example: alkylphenol ethoxylates, for example, ethoxylated nonyl phenol, alkylphenol ethoxylate or nonylphenol ethoxylate containing from about 1 to about 20 or more moles of ethylene oxide per mole of phenol.

A preferred group of compounds includes phosphate (or less preferably sulfate or sulfonate) ester of any of the above-mentioned groups of compounds. Exemplary compounds include polyethylene glycol oleyl ether phosphate (ethyleneoxide degree of polymerization 4 to 50), polyethylene glycol cetyl ether phosphate (ethyleneoxide degree of polymerization 4 to 50), polyethylene glycol stearyl ether phosphate (ethyleneoxide degree of polymerization 4 to 50), polyethylene glycol lauryl ether phosphate (ethyleneoxide degree of polymerization 4 to 50), polyethylene glycol tridecyl ether phosphate (ethyleneoxide degree of polymerization 4 to 50), polyethylene glycol nonylphenyl ether phosphate (ethyleneoxide degree of polymerization 4 to 50), polyethylene glycol octylphenyl ether phosphate (ethyleneoxide degree of polymerization 4 to 50), and the like.

In certain embodiment, the dispersant to copper and/or penflufen ratio varies from about 1:500 to about 1000:1. The preferred dispersant to copper and/or penflufen ratio is about 1:100 to about 10:1, and the most preferred ratio about 5:100 to 1:1.

Leaching is a function of particle size and the solubility of the material. Larger size particles have lower leach rates, while particles in a size range from 1 to 10 nanometers under certain circumstances will not have a leach rate much different than that of an injected and dried copper salt solution. In preferred embodiments of this invention, the $d_{50}$ is at least 0.04 microns, meaning at least 50% by weight of the particulates have a size greater than 40 nanometers. In more preferred embodiments, the $d_{50}$ is 0.10 microns or greater. In one preferred embodiment, at least 80% by weight of the particulates have a size between 0.05 microns and 1.0 microns.

Leaching is not the only mechanism whereby material can be flushed from wood. Because the material is in particulate form, there is a possibility that particulates will be flushed from the wood during the final vacuum process. Evidence suggests that very small substantially spherical nanoparticles, i.e., spherical particles of size 5 to 20 nanometers, can migrate freely through a wood matrix. However, while said particles are easy to inject, they are also clearly easily transported through wood and would be easily flushed from the wood during the final vacuum stage of vacuum/pressure impregnation process. Therefore, in preferred embodiments of the invention the material is substantially free of substantially spherical particulates, wherein the particle diameter is less than about 20 nanometers, particularly less than 15 nanometers. By substantially free we mean the $d_{20}$ is greater than 0.02 microns.

Another key aspect of the invention is to make a variety of biocidal particulate slurry compositions available that are injectable into wood, thereby serving as a particulate wood preservative. Requirements of injectability into wood for substantially round, e.g., the diameter in one direction is within a factor of two of the diameter measured in a different direction, such as would be found in milled particles, are:

1) the $d_{96}$ is equal to or less than about 1 micron, but is preferably about 0.7 microns or less, more preferably about 0.5 microns or less, for example equal to or less than about 0.3 microns, or equal to or less than about 0.2 microns;

2) the $d_{99}$ is equal to or less than about 2 microns, preferably equal to or less than 1.5 microns, more preferably equal to or less than about 1 micron; and 3) the $d_{50}$ is less than 0.5 microns, preferably less than 0.4 microns, and the $d_{50}$ is greater than 0.02 microns, more preferably greater than 0.05 microns, for example a slurry composition where the $d_{50}$ is between about 0.1 microns and about 0.3 microns. We believe the first criteria primarily addresses the phenomena of bridging and subsequent plugging of pore throats, the second criteria addresses the phenomena of forming a filter cake, and the third criteria addresses the issue of having particulates disposed in the wood which have an optimum size to ensure the treatment has an acceptable bio-activity and lifetime. Once a pore throat is partially plugged, complete plugging and undesired buildup generally quickly ensues.

However, there are minimum preferred particulate diameters for the wood treatment, which depend somewhat on the compound(s) that are in the particulates. If a copper compound has a high solubility, very small particulates having a large surface to mass ratio will result in too high a copper ion concentration, and too fast a copper leaching, compared to preferred embodiments of this invention. Generally, it is preferred that for particulate copper compounds, the $d_{20}$ be above 0.01 microns in diameter, preferably greater than 0.03 microns, for example greater than 0.06 microns in diameter. While penflufen particles can be smaller, as these compounds generally exhibit lower solubility in water than do the copper compounds, nevertheless a preferred minimum $d_{20}$ for a mixture of particulate copper compounds and particulate penflufen is 0.01 microns.

Preferred particles comprise at least 30%, preferably at least 50%, more preferably at least 70%, for example between about 80% and about 98% by weight of total of copper hydroxides, copper(I) oxide, basic copper carbonates, copper carbonates, copper oxychloride, basic copper phosphate, basic copper phosphosulfate, tribasic copper sulfate, alkaline copper nitrate, basic copper borate, copper silicate, or mixtures thereof. The various particles within a wood preservative can comprise different biocides, even different copper compounds. For example, a treatment may contain particles that comprise copper borate or copper borate in combination with copper hydroxide and/or a basic copper salt, particularly basic copper carbonate, other particles that comprise basic copper carbonate, optionally particles that comprise basic copper phosphate, and even other particles that comprise copper oxide. The particles having different phases may in preferred embodiments be of different sizes, depending on the copper material present.

In one embodiment, exemplary wood preservatives have a $d_{50}$ equal to or smaller than 0.5 μm, 0.25 μm, 0.2 μm, or 0.15 µm. Advantageously, the $d_{96}$, and preferably the $d_{99}$, are within a factor of three of the $d_{50}$, and very preferably is less than 1.2 microns. In one embodiment, the $d_{50}$ is at least 25 nanometers, for example, at least 50 nanometers.

There is a large number of references describing how to make copper-containing "nanoparticles." These references generally cannot be used to manufacture the particulates at the desired cost. One method that is particularly not cost effective is using an emulsion precipitation or emulsion crystallization technique, where small particles are allowed to grow in a certain phase of an emulsion, where the ultimate size of the particle is limited by the amount of a component in a droplet in the emulsion. Both inorganic salts and organic biocidal particulates can be formed in this manner, but not at a cost where such materials would be useful for foliar applications on crops nor for wood preservation.

U.S. Pat. No. 4,808,406, the disclosure of which is incorporated by reference, describes a useful method for producing finely divided stable cupric hydroxide composition of low bulk density comprising contacting solutions of an alkali metal carbonate or bicarbonate and a copper salt, precipitating a basic copper carbonate-basic copper sulfate to a minimum pH in the range of greater than 5 to about 6, contacting the precipitate with an alkali metal hydroxide and converting basic copper sulfate to cupric hydroxide. Another method of manufacturing the copper compounds is the method described in U.S. Pat. No. 4,404,169, the disclosure of which is incorporated by reference. This patent describes a process of producing cupric hydroxides having stability in storage if phosphate ions are added to a suspension of copper oxychloride in an aqueous phase. The copper oxychloride is then reacted with alkali metal hydroxide or alkaline earth metal hydroxide, and the cupric hydroxide precipitated as a result of the suspension is washed and then re-suspended and subsequently stabilized by the addition of acid phosphate to adjust a pH value of 7.5 to 9. The suspended copper oxychloride is preferably reacted in the presence of phosphate ions in an amount of 1 to 4 grams per liter of the suspension and at a temperature of 20° to 25° C. and the resulting cupric hydroxide is stabilized with phosphate ions.

Wet ball milling, with milling media of specified characteristics, can advantageously modify particle size and morphology of copper compounds and even solid organic biocides known to be highly resistant to milling, such as chlorothalonil and penflufen, to a size where the compounds are readily injectable into wood. Surprisingly, it has been found that both organic and inorganic particulates can be readily milled into an injectable material by wet milling with a milling material such as a 0.3 to a 0.7 mm milling media having density greater than 3 grams/cm$^3$, for example equal to or greater than 3.8 grams/cm$^3$ such as 0.5 mm diameter zirconium silicate, preferably greater than 5.5, grams/cm$^3$ provided by a 0.5 mm milling bead of zirconium oxide which may contain one or more dopants such as cerium and/or yttrium, and/or magnesia in a stabilizing amount. Additionally, regardless of the particle size of the feedstock, the particles can be broken down to injectable size in a matter of minutes to at most a few hours. Beneficially all injectable formulations for wood treatment should be wet-milled, even when the "mean particle size" is well within the range considered to be injectable into wood.

The milling media, also called grinding media or milling beads, is central to this invention. The selection of milling media is expressly not a routine optimization. The use of this media allows an average particle size and a narrow particle size distribution that had previously not been obtainable in the art, nor did the results in the prior art allow one to predict the unexpected results we obtained. A major contribution of this invention is a method of preparing a particulate biocide product having a $d_{50}$ equal to or less than about 1 micron, comprising the steps of: 1) providing the solid inorganic or organic biocide, and a liquid comprising a surface active agent, to a mill; providing a milling media comprising an effective amount of milling beads having a diameter between 0.01 mm and 0.8 mm, preferably between about 0.1 mm and about 0.7 mm, more preferably between about 0.1 mm and about 0.5 mm, wherein these milling beads have a density greater than about 2.5 grams/cm$^3$, preferably equal to or greater than 3.5 grams/cm$^3$, more preferably equal to or greater than 3.8 grams/cm$^3$, most preferably equal to or greater than 5.5 grams/cm$^3$, for example a zirconia bead having a density of about 6 grams/cm$^3$; and 2) wet milling the material at high speed, for example between 300 and 6000 rpm, more preferably between 1000 and 4000 rpm, for example between about 2000 and 3600 rpm, where milling speed is provided for a laboratory scale ball mill, for a time sufficient to obtain a product having a mean volume particle diameter of about 1 micron or smaller, for example between about 5 minutes and 300 minutes, preferably from about 10 minutes to about 240 minutes, and most preferably from about 15 minutes to about 60 minutes. As little as 5% by volume of the milling media need be within the preferred specifications for milling some materials, but better results are obtained if greater than 10% by weight, preferably greater than 25% by weight, for example between 40% and 100% by weight of the milling material is within the preferred specifications. For milling material outside the preferred specifications, advantageously this material has a density greater than 3 grams/cm$^3$ and a diameter less than 4 mm, for example 1 or 2 mm zirconia or zircionium silicate milling beads.

The milling media advantageously comprises or consists essentially of a zirconium-based material. The preferred media is zirconia (density ~6 g/cm$^3$), which includes preferred variants such as yttria stabilized tetragonal zirconium oxide, magnesia stabilized zirconium oxide, and cerium doped zirconium oxide. For some biocides, zirconium silicate (density ~3.8 g/cm$^3$) is useful. However, for several biocides such as chlorothalonil, zirconium silicate will not achieve the required action needed to obtain the narrow sub-micron range of particle sizes in several preferred embodiments of this invention. In an alternate embodiment, at least a portion of the milling media comprises or consists essentially of metallic material, e.g., steel. The milling medium is a material having a density greater than about 2.5, preferably at least about 3.8, more preferably greater than about 5.5, for example at least about 6 g/cm$^3$.

We believe that density and particle size are the two most important parameters in the milling media. Preferably the milling media comprises or consists essentially of particles, having a size (diameter) between about 0.01 mm and about 0.8 mm, preferably between about 0.1 mm and about 0.7 mm, for example between about 0.1 mm and 0.5 mm. Also preferably, the milling media can have a density greater than about 3.5 g/cm$^3$, preferably greater than about 5.5 g/cm$^3$, more preferably greater than about 6 g/cm$^3$. The zirconium-based milling media useful in the present invention can comprise or consist essentially of particles having a diameter (as the term is used in the art) between about 0.1 mm and about 0.8 mm, preferably between about 0.1 mm and about 0.7 mm, for example between about 0.1 mm and 0.5 mm.

Not all the milling media need be the preferred material, e.g., having a preferred diameter between 0.1 mm and 0.8 mm, preferably between 0.1 mm and 0.7 mm, more preferably between 0.1 mm and 0.5 mm, and having a preferred density equal to or greater than 3.5 grams/cm$^3$, preferably greater than or equal to 5.5 grams/cm$^3$, more preferably greater than or equal to 6 grams/cm$^3$. In fact, as little as 10% of this media will provide the effective grinding. The amount of the preferred milling media, based on the total weight of media in the mill, can be between 5% and 100%, is advantageously between 10% and 100%, and is preferably between 25% and 90%, for example between about 40% and 80%. Media not within the preferred category can be somewhat larger, say 1 mm to 4 mm in diameter, preferably from 1 mm to 2 mm in diameter, and advantageously also has a density equal to or greater than 3.5 grams/cm$^3$.

A first aspect of the invention is a method of preparing a micronized biocide product, e.g., penflufen comprising the steps of: 1) providing the solid biocide in particle form to a ball mill, providing a liquid to a mill, and providing a milling media to the mill, wherein the milling media comprises at least 5%, preferably at least 10%, more preferably at least 25% by weight of the milling media having a particle diameter between 0.1 to 0.8 mm, preferably between 0.1 and 0.5 mm, and having a density equal to or greater than 3.5 g/cm$^3$, preferably equal to or greater than 5.5 g/cm$^3$; and 2) milling the material for a time sufficient to obtain a product having a mean volume particle diameter $d_{50}$ of about 1 micron or smaller. The mill speed is advantageously fast, for example from 1000 rpm to about 4000 rpm, and the milling time is preferably between 10 minutes and 240 minutes.

Generally, less dense milling media will provide a relatively larger $d_{50}$, which can be useful for foliar applications. The denser milling media, for example media having a density greater than 5.5 g/cm$^3$, provides a smaller $d_{50}$. Surprisingly, varying the milling time has very little effect on the $d_{50}$. The preferred dense milling media is zirconia or cerium doped zirconia. The zirconium oxide can comprise any stabilizers and/or dopants known in the art, including, for example, cerium, yttrium, and magnesium. An alternate useful dense milling material is steel. Generally, at least 25% by weight of the milling media must have a density greater than 3.8 and a diameter between 0.1 and 0.7 mm to reliably obtain injectable particulate copper compounds.

Manufacturing injectable solid substantially insoluble organic biocide particles, e.g., penflufen, can beneficially be performed by 1) providing the penflufen and a liquid comprising surface active agents to a mill, and 2) milling the material with a milling media having a density greater than 2.5 grams/$cm^3$, for example milling beads comprising a zirconium oxide having a diameter between about 0.01 mm and about 0.5 mm, and preferably a density greater than 3.5 g/$cm^3$. The invention also encompasses an organic biocide particulate product, e.g., a penflufen product, having a $d_{50}$ below about 1 micron, typically below about 0.5 microns, and preferably between 0.1 and 0.3 microns, which advantageously also exhibits a $d_{50}$ that is less than about three times the $d_{98}$ preferably less than about two times the $d_{98}$.

The attainment of the injectable size, which generally requires both a $d_{50}$ below 0.5 microns and a $d_{98}$ less than three times the $d_{50}$, was a surprising development. Milling copper compounds for several days with a 2 mm milling media could not provide the required particle size distribution, even if the feed material had a $d_{50}$ of less than 0.3 microns. Milling a milling-resistant organic biocide, such as penflufen, with 1 mm zirconia provided a penflufen product with a $d_{50}$ of 2 to 3 microns. Yet, surprisingly, milling each of these with a preferred milling media, e.g., zirconia-based milling beads having a diameter between 0.4 and 0.5 mm, provided each of these products in injectable sub-micron slurries in under a few hours, often in less than 30 minutes.

Advantageously, the liquid comprises one or more dispersants and/or stabilizers. The presence of these promotes a smaller $d_{50}$ and a narrower particle size distribution, because agglomeration of particulates is discouraged. Aqueous dispersing agents for such dispersed solids are well known to those skilled in the art and include, but are not limited to, nonionic surfactants such as ethylene oxide/propylene oxide block copolymers, polyvinyl alcohol/polyvinyl acetate copolymers, polymeric nonionic surfactants such as the acrylic graft copolymers; anionic surfactants such as polyacrylates, lignosulfonates, polystyrene sulfonates, maleic anhydride-methyl vinyl ether copolymers, naphthalene sulfonic acid formaldehyde condensates, phosphate ester surfactants such as a tristyrenated phenol ethoxylate phosphate ester, maleic anhydride-diisobutylene copolymers, anionically modified polyvinyl alcohol/polyvinylacetate copolymers, and ether sulfate surfactants derived from the corresponding alkoxylated nonionic surfactants; cationic surfactants; zwitterionic surfactants; and the like.

Penflufen used in the present invention can be prepared in variety of ways. For example, as a solution in one or more organic solvents, an emulsion in water by emulsifying the compounds with the aid of emulsifiers, or as dispersion in particulate form by dispersing through homogenizer or high speed agitation or through milling/grinding process, or an encapsulation embed in polymer matrix or any other chemical and physical means. In one embodiment, penflufen is prepared as an emulsion concentrate. When prepared as emulsion or emulsifiable concentrate, penflufen is dissolved in the mixture solvent(s) and emulsifiers or surfactants. Non-limited examples of solvents include mineral oils, white spirits, dichloromethane, hexane, toluene, alcohols such as methanol, ethanol, benzyl alcohol and 2-propanol, glycols such as ethylene glycol and propylene glycol, ethers, esters, poly-glycols, poly-ethers, amides, methylene chloride, acetone, chloroform, N,N-dimethyl octanamide, N,N-dimethyl decanamide, N-methyl 2-pyrrolidone, n-(n-octyl)-2-pyrrolidone, and combinations of the above. Emulsifiers can be anionic, cationic, or nonionic or the combinations. Examples of emulsifiers include, but are not limited to, ethyoxylated alkylphenols or amines or amides or aryl phenols or fatty esters, fatty acids and derivatives, ethoxylated alcohols and derivatives, sulfonated amine or amides and derivatives, carboxylated alcohol or alkylphenol ethoxylates and derivatives, glycol ethers or esters. Additional examples of emulsifers can be found in McCutcheon's Emulsifiers and Detergents, 2016. In another embodiment, penflufen is prepared as microencapsulated particles. Microencapsulation of penflufen include steps of preparation of solutions, homogenization and solvent evaporation. When prepared as microencapsulation, penflufen is first dissolved in a solvent(s) followed by addition of a polymer(s) or emulsifier. The mixture is then homogenized under high shear mixing, and the solvent remained in the mixture is then evaporated off, and the final microencapsulation is formed. In a more preferred embodiment, penflufen is prepared as a micronized dispersion through milling process.

The milling of the organic biocides is advantageously performed in the presence of an aqueous medium containing surfactants and/or dispersants, such as those known in the art. Use of other media, including for example polar organic solvents such as alcohols, generally does not offer added advantage sufficient to outweigh the cost and associated hazards of milling with solvents. Because it is now possible to achieve a smaller particle size and a narrower particle size distribution using the present invention than was previously known in the art, the number and amount of stabilizers and/or dispersants are less critical. As used herein, the term "surface active agent" includes both singular and plural forms and encompasses generally both stabilizers and dispersants. The surface active agent may be anionic, cationic, zwitterionic, or nonionic, or a combination thereof. Generally, higher concentrations of surface active agents present during milling result in a smaller particle size.

Examples of other suitable classes of surface active agents include, but are not limited to, anionics such as alkali metal fatty acid salts, including alkali metal oleates and stearates; alkali metal lauryl sulfates; alkali metal salts of diisooctyl sulfosuccinate; alkyl aryl sulfates or sulfonates, lignosulfonates, alkali metal alkylbenzene sulfonates such as dodecylbenzene sulfonate, alkali metal soaps, oil-soluble (e.g., calcium, ammonium, etc.) salts of alkyl aryl sulfonic acids, oil soluble salts of sulfated polyglycol ethers, salts of the ethers of sulfosuccinic acid, and half esters thereof with nonionic surfactants and appropriate salts of phosphated polyglycol ethers; cationics such as long chain alkyl quaternary ammonium surfactants including cetyl trimethyl ammonium bromide, as well as fatty amines; nonionics such as ethoxylated derivatives of fatty alcohols, alkyl phenols, polyalkylene glycol ethers and condensation products of alkyl phenols, amines, fatty acids, fatty esters, mono-, di-, or triglycerides, various block copolymeric surfactants derived from alkylene oxides such as ethylene oxide/propylene oxide (e.g., PLURONIC™, which is a class of nonionic PEO-PPO co-polymer surfactant commercially available from BASF), aliphatic amines or fatty acids with ethylene oxides and/or propylene oxides such as the ethoxylated alkyl phenols or ethoxylated aryl or polyaryl phenols, carboxylic esters solubilized with a polyol or polyvinyl alcohol/polyvinyl acetate copolymers, polyvinyl alcohol, polyvinyl pyrrolidinones (including those sold under the tradenames AGRIMER™ and GANEX™), cellulose derivatives such as hydroxymethyl cellulose (including those commercially available from Dow Chemical Company as METHOCEL™), and acrylic acid graft copolymers; zwitterionics; and the like; and mixtures, reaction products, and/or copolymers thereof.

Additionally or alternatively, the surface active agent may include, but is not limited to, low molecular weight sodium lauryl sulfates, calcium dodecyl benzene sulfonates, tristyryl ethoxylated phosphoric acid or salts, methyl vinyl ether-maleic acid half-ester (at least partially neutralized), beeswax, water soluble polyacrylates with at least 10% acrylic acids/salts, or the like, or a combination thereof.

Additionally or alternatively, the surface active agent may include, but is not limited to, alkyl grafted PVP copolymers commercially available as GANEX™ and/or the AGRIMER™ AL or WP series, PVP-vinyl acetate copolymers commercially available as the AGRIMER™ VA series, lignin sulfonate commercially available as REAX 85A (e.g., with a molecular weight of about 10,000), tristyryl phenyl ethoxylated phosphoric acid/salt commercially available as SOPROPHOR™ 3D33, GEROPON™ SS 075, calcium dodecylbenzene sulfonate commercially available as NINATE™ 401 A, IGEPAL™ CO 630, other oligomeric/polymeric sulfonated surfactants such as Polyfon H (molecular weight ~4300, sulfonation index ~0.7, salt content ~4%), Polyfon T (molecular weight ~2900, sulfonation index ~2.0, salt content ~8.6%), Polyfon O (molecular weight ~2400, sulfonation index ~1.2, salt content ~5%), Polyfon F (molecular weight ~2900, sulfonation index ~0.3.3, salt content ~12.7%), Reax 88B (molecular weight ~3100, sulfonation index ~2.9, salt content ~8.6%), Reax 100 M (molecular weight ~2000, sulfonation index ~3.4, salt content ~6.5%), and Reax 825 E (molecular weight ~3700, sulfonation index ~3.4, salt content ~5.4%), and the like.

Other notable surface active agents can include nonionic polyalkylene glycol alkyd compounds prepared by reaction of polyalkylene glycols and/or polyols with (poly)carboxylic acids or anhydrides; A-B-A block-type surfactants such as those produced from the esterification of poly(12-hydroxystearic acid) with polyalkylene glycols; high molecular weight esters of natural vegetable oils such as the alkyl esters of oleic acid and polyesters of polyfunctional alcohols; a high molecular weight (MW>2000) salt of a naphthalene sulfonic acid formaldehyde condensate, such as GALORYL™ DT 120L available from Nufarm; MORWET EFW™ available from Akzo Nobel; various Agrimer™ dispersants available from International Specialties Inc.; and a nonionic PEO-PPO-PEO triblock co-polymer surfactant commercially available as PLURONIC™ from BASF.

Other examples of commercially available surface active agents include Atlox 4991 and 4913 surfactants (Uniqema), Morwet D425 surfactant (Witco), Pluronic P105 surfactant (BASF), Iconol TDA-6 surfactant (BASF), Kraftsperse 25M surfactant (Westvaco), Nipol 2782 surfactant (Stepan), Soprophor FL surfactant (Rhone-Poulenc), Empicol LX 28 surfactant (Albright & Wilson), Pluronic F108 (BASF).

In one embodiment, exemplary suitable stabilizing components include polymers or oligomers having a molecular weight from about 250 to about $10^6$, preferably from about 400 to about $10^5$, more preferably from about 400 to about $10^4$, and can include, for example, homopolymers or co-polymers described in "Polymer Handbook," 3rd Edition, edited by J. Brandrup and E. H. Immergut.

In another embodiment, exemplary suitable stabilizing components include polyolefins such as polyallene, polybutadiene, polyisoprene, poly(substituted butadienes) such as poly(2-t-butyl-1,3-butadiene), poly(-chlorobutadiene), poly(-chloromethyl butadiene), polyphenylacetylene, polyethylene, chlorinated polyethylene, polypropylene, polybutene, polyisobutene, polybutylene oxides, copolymers of polybutylene oxides with propylene oxide or ethylene oxide, polycyclopentylethylene, polycyclolhexyiethylene, polyacrylates including polyalkylacrylates and polyarylacrylates, polymethacrylates including polyalkylmethacrylates and polyarylmethacrylates, polydisubstituted esters such as poly(di-n-butylitaconate), poly(amylfumarate), polyvinylethers such as poly(butoxyethylene) and poly(benzyloxyethylene), poly(methyl isopropenyl ketone), polyvinyl chloride, polyvinyl acetate, polyvinyl carboxylate esters such as polyvinyl propionate, polyvinyl butyrate, polyvinyl caprylate, polyvinyl laurate, polyvinyl stearate, polyvinyl benzoate, polystyrene, poly-t-butyl styrene, poly (substituted styrene), poly(biphenyl ethylene), poly(1,3-cyclohexadiene), polycyclopentadiene, polyoxypropylene, polyoxytetramethylene, polycarbonates such as poly(oxycarbonyloxyhexamethylene), polysiloxanes, in particular, polydimethyl cyclosiloxanes and organo-soluble substituted polydimethyl siloxanes such as alkyl, alkoxy, or ester substituted polydimethylsiloxanes, liquid polysulfides, natural rubber and hydrochlorinated rubber, ethyl-, butyl- and benzyl-celluloses, cellulose esters such as cellulose tributyrate, cellulose tricaprylate, and cellulose tristearate, natural resins such as colophony, copal, and shellac, and the like, and combinations or copolymers thereof.

In still another embodiment, exemplary suitable stabilizing components include co-polymers of styrene, alkyl styrenes, isoprene, butenes, butadiene, acrylonitrile, alkyl acrylates, alkyl methacrylates, vinyl chloride, vinylidene chloride, vinyl esters of lower carboxylic acids, and α,β-ethylenically unsaturated carboxylic acids and esters thereof, including co-polymers containing three or more different monomer species therein, as well as combinations and copolymers thereof.

In yet another embodiment, exemplary suitable stabilizing components include polystyrenes, polybutenes, for example polyisobutenes, polybutadienes, polypropylene glycol, methyl oleate, polyalkyl(meth)acryl ate e.g. polyi sobutylacrylate or polyoctadecylmethacrylate, polyvinyl esters e.g. polyvinyl stearate, polystyrene/ethyl hexylacrylate copolymer, and polyvinylchloride, polydimethyl cyclosiloxanes, organic soluble substituted polydimethyl siloxanes such as alkyl, alkoxy or ester substituted polydimethylsiloxanes, and plybutylene oxides or copolymers of polybutylene oxides with propylene and/or ethylene oxide. In one embodiment, the surface active agent can be adsorbed onto the surface of the biocide particle, e.g., in accordance with U.S. Pat. No. 5,145,684.

Another aspect of the invention is a method of preparing a micronized organic biocide (e.g. penflufen) product comprising the steps of: 1) providing the organic biocide to a mill, and 2) milling the material with a milling media having a density greater than about 2.5 and having a diameter between about 0.01 mm and about 0.7 mm. The density of the milling media, and especially of the milling media within the size range 0.1 to 0.5 mm, is advantageously greater than about 3.5, for example greater than about 4, preferably greater than about 5.5, for example equal to or greater than about 6 grams per cubic centimeter. Ceramic milling media is preferred over metallic milling media.

In each embodiment, the milling load is preferably about 50% or higher of the volume of the mill, though loadings between 40% and 90% are efficient. In each embodiment, advantageously water and surface active agents or dispersants are added to the product before or during milling. In each embodiment, the product can be transported as a stable slurry, as a wettable powder, or as granules that disintegrate on mixing with water to release the product.

Wet milling can be done in a sand grinder charged with for example partially stabilized zirconia beads with diameter 0.5 mm; alternately wet milling in a rotary sand grinder with partially stabilized zirconia beads with diameter 0.5 mm and with stirring at for example 1000 rpm; or by use of a wet-ball mill, an attritor (e.g., manufactured by Mitsui Mining Ltd.), a perl mill (e.g., manufactured by Ashizawa Ltd.), or the like. Modifications of the above processes are within the skill of one of ordinary skill in the art, and such modifications will not be described here.

A milling process using 0.5 mm high density zirconium silicate and more preferably 0.5 mm zirconia grinding media provides further efficient attrition, especially for the removal of particles greater than about 1 micron in the coarse material of penflufen. This wet milling process is inexpensive, and all of the precipitate can be used in the injectable copper-containing particulate wood treatment. The milling agents can be zirconia, partially stabilized zirconia, zirconium silicate, and yttrium/zirconium oxide, for example, recognizing that the more dense materials give faster particle size attrition. The size and density of the milling material is believed to be important, even critical, to obtaining a commercially acceptable process. The milling agent material having a diameter of 2 mm or greater are ineffective over hours and days, milling material of diameter of 1 mm is ineffective over times in the prior art, e.g., 10 minutes to an hour, while milling agent material having a diameter of 0.5 mm is effective typically after 15 minutes of milling.

Alternately or additionally, the organic biocide can be contained in milled injectable solid organic biocide particulates. Generally, such a small quantity of organic biocides are required that the $d_{50}$ of the organic biocides is advantageously between about 0.2 to about 0.8 times the $d_{50}$ of the copper compounds.

The particle size distribution of the particulates in one embodiment is such that at least about 50% by weight of the particulates have an average diameter, or mean particle size, between about 0.02 microns and about 1.0 microns, or preferably at least about 50% by weight of the particulates have an average diameter between about 0.05 microns and about 0.5 microns.

In another embodiments of this invention, the particulate-based biocidal composition is substantially free of alkanolamines, e.g., the composition comprises less than 5% alkanolamines, preferably less than 1.0% alkanolamines, or is totally free of alkanolamines.

In preferred embodiments of this invention, the particulate-based biocidal composition is substantially free of ammonium compounds (e.g., ammonium hydroxide), e.g., the composition comprises less than 5% ammonia, preferably less than 1% ammonia, or is totally free of ammonium compounds, with the proviso that ammonium compounds whose primary function is as an organic biocide are excluded.

In preferred embodiments of this invention, the biocidal composition is substantially free of organic solvents, e.g., the slurry comprises less than 1% organic solvents, preferably less than 0.1% organic solvents, or is totally free of organic solvents.

The loading of biocidal composition will depend on a variety of factors, including the desired copper and/or penflufen loading in the wood, the porosity of the wood, and the dryness of the wood. Calculating the amount of copper-based compositions is well within the skill of one of ordinary skill in the art. Generally, the desired copper loading into wood is between 0.0025 and about 0.5 pounds copper per cubic foot (pcf) of wood. Generally, the desired loading of penflufen into wood is between about 4 and about 200 g/m$^3$, preferably between about 8 and about 80 g/m$^3$. In certain embodiments, the current invention comprises a copper compound and penflufen in a copper:penflufen ratio of between about 1:1 to about 500:1. In another preferred embodiment, the present composition can further be used in combination with other known preservative chemicals, including boron based preservatives, such as boric acid, sodium salt of borates; triazole compounds, pentachlorophenol, and sodium fluoride. Triazoles of the wood preservative formulations of the invention include, but are not limited to epoxiconazole, triadimenol, propiconazole, prothioconazole, metconazole, cyproconazole, tebuconazole, flusilazole, paclobutrazol, fluconazole, isavuconazole, itraconazole, voriconazole, pramiconazole, ravuconazole, and posaconazole.

In one embodiment the biocidal composition comprises between 50 and 800 ppm of one or more scale precipitation inhibitors or corrosion inhibitors, particularly nitrite compounds and organophosphonates. Nitrite compounds include, not limiting to, sodium nitrite, calcium nitrite or potassium nitrite. Alternately or additionally the composition may contain between about 50 and about 2000 ppm of one or more chelators. Both of these additives are meant to inhibit precipitation of salts such as calcium carbonate and the like, where the source of calcium may be from the water used to make up the slurry. The preferred inhibitors are hydroxyethylidene diphosphonic acid (HEDP), diethylenetriamine-pentamethylenephosphonic acid (DTPMP), and/or 2-phosphonobutane-1,2,4-tricarboxylic acid (PBTC). If the preservative is in a concentrate, the composition should comprise between 10 mmoles and 100 mmoles/L of HEDP, or between 30 mmoles and 170 mmoles/L of PBTC or DTPMP. Mixtures of inhibitors are preferred, as concentrates may have more inhibitor than can readily be solubilized therein. If the preservative is in a solid form, the preservative should comprise between about 0.1 to about 1 mole HEDP per kg of particulates, or between about 0.17 to about 2 mole PBTC and/or DTPMP per kg of particulates.

The biocidal composition can contain one or more additives to aid wetting, for example surfactants. Surfactants may be in solution, or alternatively may bind to the surface, in which case they are surface-active agents and may function as stabilizers or dispersants. Preferred dispersing agents include a surface active portion that interacts with the copper-containing particle and a second preferably different portion, which operates to inhibit irreversible agglomeration of the copper-based particles. For example, a polyacrylate dispersing agent may include at least one carboxyl group capable of associating, such as electrostatically, with a copper-containing particle and a second, hydrophobic portion that may operate to inhibit the permanent agglomeration of the copper-containing particles. Exemplary dispersing agents may include at least one of a surfactant, a polyacrylate, a polysaccharide, a polyaspartic acid, a polysiloxane, and a zwitterionic compound. Exemplary compounds useful as dispersing agents are discussed in the section relating to milling. The particulate-based biocidal compositions preferably exclude emulsifiers and surfactants.

In one embodiment of the invention, the particulate copper compound may comprise a polymer or polymeric dispersant, collectively polymer. In this embodiment, the ratio of the weight of copper present in the particles to polymer present in the particles may be at least about 100 to 1, for example at least about 2 to 1, 4 to 1, 5 to 1, 7 to 1, or at least about 10 to 1. For example, if ratio of the weight of copper present in the particles to the weight of polymer present in the particles is at least about 2 to 1, the particles comprise at least about twice as much copper by weight as polymer. Another aspect of the invention relates to a preservative useful for wood or wood products, the preservative preferably comprising a preferably aqueous suspension of particulate copper compounds and particulate penflufen. If a polymeric dispersing agent is present in the suspension, the ratio of the weight of copper present in the copper-based particles of the suspension to the weight of dispersing agent present in the suspension may be at least about 1 to 1, for example at least about 5 to 1, 10 to 1, 15 to 1, 20 to 1 or at least about 30 to 1.

Dispersing agents aid particulate dispersion and to prevent aggregation of particulates. Sub-micron sized particulates have a tendency to form much larger aggregates. Aggregates as used herein are physical combinations of a plurality of similarly-sized particles, often brought together by van der Waals forces or electrostatic forces. If aggregates are allowed to form they often can age into a stable aggregate that cannot be readily broken up by mechanical agitation, for example by vigorous stirring of a slurry. Such aggregates may grow to a size where the aggregates are not readily injectable, or may be of a size to make the aggregates visible, therefor giving undesired color. In preferred embodiments of the invention at least 30%, preferably at least 60%, more preferably at least 90% by weight of the substantially crystalline particulate copper compounds in a slurry composition are mono-disbursed, e.g., are not in aggregates. Further, the particles advantageously do not tend to agglomerate when injected into the wood. To prevent particulates from agglomerating, the concentrated slurry or paste may comprise polymers, such as polyvinyl alcohols, polyvinyl pyrrolidones, polyalkylene glycols and polyacrylates, in quantities of 0.1 to 20% by weight, based on the weight of the particulates.

The biocidal compositions mentioned can be prepared in a manner known per se, for example by mixing the active compounds with the liquid carrier, and including dispersants and/or binders or fixative, and other processing auxiliaries. Particulates can be provided in a concentrated slurry, in a very concentrated paste, as dry particulates, as coated dry particulates, as part of a dry pre-mix, or any combination thereof.

In one embodiment, the composition of the current invention is prepared as a concentrate. If the wood treatment is to be manufactured, stored, or transported in a wetted form, it is beneficially in a concentrated form to minimize the volume and expense of handling water. Preferably the concentrated slurry or paste (for shipping and storing, for example, comprises between 5% and 80% by weight, for example between about 15% and 40%, of particulate copper compounds and/or penflufen, with the remainder of the concentrated slurry or paste beneficially being a fluid carrier. The concentrated slurry or paste may further comprise solid particulates that are carriers for one or more organic biocides, and solid particulates comprising corrosion inhibitors. The aqueous carrier beneficially comprises one or more additives as discussed for the slurry, including anti-oxidants, disbursing agents, other biocidal salts and compounds, chelators, corrosion inhibitors, e.g., phosphate and/or borate salts, alkali metal hydroxides and/or carbonates, antifreeze, and the like. The concentration of these additives will depend in part on the degree to which the composition is expected to be diluted to make a commercially useful injectable particulate-based biocidal composition having the proper copper loading for the types of wood.

In one embodiment, the material comprises A) about 30% to 70% by weight of a mixture of a particulate copper compound and particulate penflufen, e.g., copper hydroxide, for example, about 35% to 65%, such as about 38% to about 61% of a copper compound, in particulate form; B) about 10% to 35% by weight, such as about 15% to about 30% of at least one dispersing agent, e.g., lignosulfonates or polyacrylates; C) between about 2.5% to 20% by weight, such as about 5% to 15% of at least one wetting agent, for example, a surfactant, e.g., Morwet EP available from Barton Solvents, Inc.; D) between about 5% to about 25% by weight, such as about 10% to 20% of at least one diluent, for example soluble and insoluble diluents, such as those used in agricultural products, e.g., clay, such as an attapulgite clay, or particulate carrier particles comprising organic biocide; E) between about 0.05% to 7.5% by weight, such as about 0.1% to about 5%, of at least one antifoam agent; and optionally F) about 2.5% to about 25%, alternatively less than about 7.5%, such as less than about 5% by weight, of water.

Another aspect of the invention relates a method of preserving wood or a wood product comprising injecting into wood or dispersing into a wood product one or more of the biocidal particulate compositions of this invention. The material of this invention is useful for wood, and also for wood products, e.g., wood composites. Exemplary wood products include oriented strand board, particle board, medium density fiberboard, plywood, laminated veneer lumber, laminated strand lumber, hardboard and the like. Preferred methods of preserving wood composites require the preservative of this invention either be mixed with the wood material or fibers before bonding, or more preferably injected into the wood material or fibers, followed by bonding.

In one embodiment, the wood or wood product has a surface, a thickness, a width, and a length. Preferably, the wood or wood product comprises a homogenous distribution of micronized copper compounds and micronized penflufen. In one embodiment, a volume number density of the copper-based particles 5 cm from the surface, and preferably throughout the interior of the wood or wood product, is at least about 50%, for example, at least about, 60%, 70%, or 75% a volume number density of the copper-based particles 1 cm from the surface.

The wood preservative compositions of the invention can be applied to wood through dipping, brushing, spraying or vacuum/pressure treatment. Wood or wood products comprising copper compounds and penflufen in accordance with the present invention may be prepared by subjecting the present composition into wood through a vacuum and/or pressure process. In a preferred embodiment, vacuum and/or pressure techniques are used to impregnate the wood in accord with this invention including the standard processes, such as the "Empty Cell" process, the "Modified Full Cell" process and the "Full Cell" process, and any other vacuum and /or pressure processes which are well known to those skilled in the art. In another embodiment, the treating liquid may be applied by a microwave or radio frequency treating process. In this process, the wood substrate is first heated using a radio frequency or microwave energy. The temperature of the heated target zone can vary from 40° C. to 300° C., and more preferably 80° C. to 100° C. Immediately after the heating, a liquid formulation comprising pyrazole and isothiazolinone is contacted with the substrate. The temperature of the liquid formulation is below that of the heated target zone at the time the composition is applied, the difference between the temperatures of the composition and the heated target zone being sufficient to reduce pressure in the substrate after the composition is applied. Various frequencies of radio or microwave energy may be used. The frequency of the radio frequency or microwave energy can vary from 0.1MHz to 100 MHz, preferably between 10 and 50 MHz, a more preferably from 20 to 40 MHz. Skilled persons may readily appreciate appropriate wavelengths outside this rangeThe treating fluid may also be applied to wood by a Microwave process. The compositions of the present invention can also be used for supplemental or remedial treatment of wood in service, such as utility poles and railroad ties. When used as remedial preservative purpose, the compositions can be in the form of a paste- or grease-type of formulations, if desired, such that the formulation has an adhesive nature and is easy to apply to a desired location. When making a paste or grease type of formulations, 0.5% to about 30% of an inorganic clay thickening agent, or a mixture of such thickening agents, is often used. The inorganic clay thickening agents include a fibrous structure type such as attapulgite clay and sepiolite clay, a non-crystal structure type such as allophane, and mixed layer structure type such as montmorillonite and kaolinte and the above layer structure types. Examples of inorganic clay minerals, but not limited to, are: attapulgite, dickite, saponite, montmorillonite, nacrite, kaolinite, anorthite, halloysite, metahalloysite, chrysotile, lizardite, serpentine, antigorite, beidellite,stevensite, hectonite, smecnite, nacrite and sepiolite, montmorillonite, sauconite, stevensite, nontronite, saponite, hectorite, vermiculite, smecnite, sepiolite, nacrite, illite, sericite, glauconite-montmorillonite, roselite-montmorillonite, Bentone 38 (hectorite) and Bentone 34 (bentonite), chlorite-vermiculite, illite-montmorillonite, halloysite-montmorillonite, kaolinite-montmorillonite. The clay minerals employed in the compositions of the present invention also contain exchangeable cations including, but not limited to, aluminum ions, protons, sodium ions, potassium ions, calcium ions, magnesium ions, lithium ions, and the like. Among the above inorganic clay minerals, attapulgite, hectorite, bentonite, montmorillonite, sauconite, smecnite, stevensite, beidellite, nontronite, saponite, hectorite, vermiculite, nacrite, and sepiolite are particularly preferable for the present invention. In this embodiment, the composition of the present invention can be applied to the wood surface through external coating treatment.

EXAMPLES

The following examples are merely indicative of the nature of the present invention, and should not be construed as limiting the scope of the invention, nor of the appended claims, in any manner.

Example 1—Synergism

The synergism was determined using a modified method as described by Kull et al. (Applied Microbiology, 1961 (9): 538-541). The modified method is described as below:

$$Q_A/Q_a + Q_B/Q_b = SI$$

Where:
$Q_a$=concentration of substance A alone which controls a particular decay fungus
$Q_b$=concentration of substance B alone which controls a particular decay fungus
$Q_A$=concentration of substance A in the concentration of the A and B mixture at which controls a particular decay fungus
$Q_B$=concentration of substance B in the concentration of the A and B mixture at which controls a particular decay fungus
SI=1 means additivity
SI>1 means antagonism
SI<1 means synergism Example 2—Synergistic Activity of a Combination of Copper Fungicide and Penflufen Against Various Wood Decay Brown Rot Fungi Wood cubes measuring 19 mm×19 mm×19 mm were prepared from southern pine sapwood. One set of wood cubes were pressured treated with serial treating solutions containing penflufen fungicide. A second set of wood cubes were pressure treated with treating solutions containing the copper fungicide. A third set of wood cubes were pressure treated with treating solutions containing a mixture of the copper and penflufen. The treated wood samples were exposed to various fungi to conduct a laboratory decay resistance test following protocols as described in American Wood Protection Association Standard E10-2015. Before and after exposure to fungi, the wood samples were weighed to determine the weight percent loss. No weight loss means complete control of the fungal attack. The results are reported in Table 1.

TABLE 1

| Brown Rot Fungi | Copper Retention in Wood as Cu in kg/m$^3$ | Cu to Penflufen Ratio | SI |
|---|---|---|---|
| Gloeophyllum trabeum | 0.91 | 228 to 1 | 0.37 |
| Fibroporia radiculosa | 0.91 | 23 to 1 | 0.79 |
| Postia placenta | 0.91 | 114 to 1 | 0.95 |
| Coniophora Postia puteana | 0.91 | 228 to 1 | 0.79 |

Example 3—Wood Stakes Treated with Amine Copper and Penflufen Field Efficacy Testing Wood stakes measuring 19 mm×19 mm×450 mm were prepared from southern pine sapwood. The wood stakes were treated with treating solutions containing a copper ethanolamine solution and a penflufen emulsion at different ratios varying from copper:penflufen of 5:1 to 200:1. The treated wood stakes were installed in field testing plots such as Gainesville, Fla. and Maunawili, Hi., and both testing locations have been well established to have severe decay hazard. The field stakes were inspected for efficacy against decay fungi and termite annually, and the test were conducted following protocols as described in American Wood Protection Association Standard E7. The annual inspection results from both filed locations indicated that wood stakes treated with copper and penflufen are resistant to decay and termite attack.

Example 4—Wood Stakes Treated with Micronized Copper and Penflufen Field Efficacy Testing Wood stakes measuring 19 mm×19 mm×450 mm were prepared from southern pine sapwood. The wood stakes were treated with treating solutions containing micronized copper fungicide and a penflufen at different ratios varying from copper:penflufen of 5:1 to 200:1. The treated wood stakes were installed in field testing plots such as Gainesville, Fla. and Maunawili, Hi., and both testing locations have been well established to have severe decay hazard. The field stakes were inspected for efficacy against decay fungi and termite annually, and the test were conducted following protocols as described in American Wood Protection Association Standard E7. The annual inspection results from both filed locations indicated that wood stakes treated with copper and penflufen are resistant to decay and termite attack.

Example 5—Wood Stakes Treated with Micronized Penflufen Field Efficacy Testing

Southern pine wood samples were treated with treating solutions containing a micronized penflufen at different loadings in wood varying from 10 to 250 grams per cubic meter. The treated wood stakes were installed in field testing plots such as Gainesville, Fla. and Maunawili, Hi., and both testing locations have been well established to have severe decay hazard. The field stakes were inspected for efficacy against decay fungi and termite annually, and the test were conducted following protocols as described in American Wood Protection Association Standard E16. The annual inspection results from both filed locations indicated that wood stakes treated with micronized penflufen are resistant to decay and termite attack.

Example 6—Preparation of Micronized Penflufen

Penflufen was mixed with a dispersant in water medium. The mixture slurry was mixed for about 10 minutes, and then transferred to a ball mill containing zirconia grinding media according to the present invention. The slurry was ground for about 2 hours and stable micronized penflufen dispersion was obtained. The particle size of the penflufen dispersion was monitored by measuring its particle size. The results are reported in Table 2.

TABLE 2

| | Particle Size Stability of Penflufen Dispersion at Different Temperatures | | | | | | | | |
|---|---|---|---|---|---|---|---|---|---|
| | 4° C. | | | 24° C. | | | 32° C. | | |
| Test Duration | $d_{50}$, μm | $D_{95}$, μm | Mean, μm | $d_{50}$, μm | $D_{95}$, μm | Mean, μm | $d_{50}$, μm | $D_{95}$, μm | Mean, μm |
| Initial | 0.298 | 0.490 | 0.311 | 0.298 | 0.490 | 0.311 | 0.298 | 0.490 | 0.311 |
| 1 Month | 0.310 | 0.495 | 0.319 | 0.315 | 0.497 | 0.323 | 0.331 | 0.505 | 0.341 |
| 4 Months | 0.312 | 0.496 | 0.321 | 0.317 | 0.498 | 0.325 | 0.323 | 0.500 | 0.331 |
| 6 months | 0.309 | 0.494 | 0.316 | 0.307 | 0.494 | 0.315 | 0.336 | 0.506 | 0.343 |

Example 7—Preparation of The Mixture of Micronized Copper and Micronized Penflufen Micronized copper was prepared by milling a slurry of basic copper carbonate and micronized penflufen was prepared by milling penflufen solid. The final micronized copper and micronized penflufen were mixed together at various ratios, and the particle size of the final mixture was monitored. The results are reported in Tables 3-5. The level of copper and penflufen in the mixture was also monitored by chemically analyzing the copper content and penflufen content, and the result is given in Table 6.

TABLE 3

Particle Size Stability of Mixture of Penflufen in Dispersed BCC (Cu:Penflufen = 25:1) at Different Temperatures

| Test Duration | 4° C. | | | 24° C. | | | 38° C. | | |
|---|---|---|---|---|---|---|---|---|---|
| | $d_{50}$, μm | $D_{95}$, μm | Mean, μm | $d_{50}$, μm | $D_{95}$, μm | Mean, μm | $d_{50}$, μm | $D_{95}$, μm | Mean, μm |
| Initial | 0.365 | 0.532 | 0.369 | 0.365 | 0.532 | 0.369 | 0.365 | 0.532 | 0.369 |
| 3 weeks | 0.365 | 0.500 | 0.358 | 0.362 | 0.506 | 0.365 | 0.369 | 0.521 | 0.373 |
| 6 weeks | 0.339 | 0.498 | 0.344 | 0.361 | 0.522 | 0.365 | — | — | — |
| 6 months | 0.353 | 0.505 | 0.357 | 0.357 | 0.513 | 0.361 | 0.356 | 0.510 | 0.360 |

TABLE 4

Particle Size Stability of Penflufen in Dispersed BCC (Cu:Penflufen = 50:1) at Different Temperatures.

| Test Duration | 4° C. | | | 24° C. | | | 38° C. | | |
|---|---|---|---|---|---|---|---|---|---|
| | $d_{50}$, μm | $D_{95}$, μm | Mean, μm | $d_{50}$, μm | $D_{95}$, μm | Mean, μm | $d_{50}$, μm | $D_{95}$, μm | Mean, μm |
| Initial | 0.365 | 0.531 | 0.370 | 0.365 | 0.531 | 0.370 | 0.365 | 0.531 | 0.370 |
| 3 weeks | 0.349 | 0.493 | 0.351 | 0.366 | 0.508 | 0.368 | 0.369 | 0.527 | 0.373 |
| 6 weeks | 0.334 | 0.491 | 0.338 | 0.366 | 0.529 | 0.370 | — | — | — |
| 6 months | 0.337 | 0.493 | 0.341 | 0.360 | 0.521 | 0.364 | 0.361 | 0.523 | 0.366 |

TABLE 5

Particle Size Stability of Mixture of Penflufen in Dispersed BCC (Cu:Penflufen = 100:1) at Different Temperatures.

| Test Duration | 4° C. | | | 24° C. | | | 38° C. | | |
|---|---|---|---|---|---|---|---|---|---|
| | $d_{50}$, μm | $D_{95}$, μm | Mean, μm | $d_{50}$, μm | $D_{95}$, μm | Mean, μm | $d_{50}$, μm | $D_{95}$, μm | Mean, μm |
| Initial | 0.365 | 0.530 | 0.370 | 0.365 | 0.530 | 0.370 | 0.365 | 0.530 | 0.370 |
| 3 weeks | 0.355 | 0.499 | 0.357 | 0.362 | 0.508 | 0.365 | 0.372 | 0.525 | 0.375 |
| 6 weeks | 0.352 | 0.505 | 0.356 | 0.363 | 0.527 | 0.368 | — | — | — |
| 6 months | 0.355 | 0.507 | 0.359 | 0.358 | 0.516 | 0.363 | 0.358 | 0.515 | 0.362 |

TABLE 6

Stability of Active % Penflufen in Dispersed BCC Solution at Different Temperatures.

| Test Duration | Cu:Penflufen = 25:1 | | Cu:Penflufen = 50:1 | | Cu:Penflufen = 100:1 | |
|---|---|---|---|---|---|---|
| | 24 °C. | 38° C. | 24 °C. | 38 C. | 24 °C. | 38° C. |
| Initial | 1.22 | 1.22 | 0.66 | 0.66 | 0.33 | 0.33 |
| 1 week | 1.24 | 1.21 | 0.66 | 0.66 | 0.33 | 0.33 |
| 2 weeks | 1.21 | 1.22 | 0.66 | 0.67 | 0.33 | 0.33 |
| 3 weeks | 1.23 | 1.22 | 0.67 | 0.66 | 0.33 | 0.32 |
| 4 weeks | 1.23 | 1.23 | 0.67 | 0.67 | 0.33 | 0.33 |
| 8 weeks | 1.24 | 1.21 | 0.68 | 0.66 | 0.34 | 0.33 |
| 12 weeks | 1.22 | 1.42 | 0.65 | 0.64 | 0.33 | 0.31 |
| 16 weeks | 1.21 | 1.09 | 0.67 | 0.65 | 0.33 | 0.31 |
| 24 weeks | 1.34 | 1.20 | 0.69 | 0.66 | 0.34 | 0.32 |
| 48 weeks | 1.22 | 1.24 | 0.68 | 0.67 | 0.34 | 0.33 |

Example 8—Bio-Efficacy of Dispersed Penflufen Against Wood Decay Fungi

Wood cubes measuring 19 mm×19 mm×19 mm were prepared from southern pine sapwood. The wood cubes were pressure treated with treating solutions containing micronized penflufen. The treated wood samples were exposed to various fungi to conduct a laboratory decay resistance test following protocols as described in American Wood Protection Association Standard E10-2015. Before and after exposure to fungi, the wood samples were weighed to determine the weight percent loss. The test results are summarized in Table 7.

TABLE 7

Mean Percent Weigh Loss of Treated Wood Cubes at Different Penflufen Retention.

| Penflufen Retention, g/m³ | Decay Fungi | | | |
|---|---|---|---|---|
| | *Coniophora puteana* | *Gloeophyllum trabeum* | *Fibroporia radiculosa* | *Postia placenta* |
| 8 | 1.4 | 3.1 | 12.0 | 3.5 |
| 12 | 1.6 | 2.9 | 10.4 | 1.9 |
| 16 | 1.6 | 3.6 | 8.2 | 2.1 |
| 24 | 1.5 | 3.0 | 8.2 | 1.2 |
| 32 | 1.1 | 3.5 | 5.4 | 1.2 |
| 48 | 1.4 | 3.0 | 5.7 | 1.1 |
| 64 | 2.0 | 1.6 | 4.4 | 1.1 |
| 80 | 1.3 | 2.0 | 3.0 | 1.3 |
| 0 (Untreated SP) | 25.3 | 41.7 | 49.1 | 47.5 |

Example 9—Preparation of Wood Preservative Treating Solution Comprising Micronized Copper and Penflufen Actives A series of wood preservative treating solutions were prepared by mixing a micronized copper concentrate and a penflufen concentrate with water. Alternatively, the wood preservative treating solutions can be prepared by diluting micronized copper+penflufen concentrate with water. Other additives, such as mold inhibitors, water repellent, and/or pigments can be added to the treating solutions as well. The penflufen can be prepared either as an emulsion concentrate (EC) or a suspension/dispersion concentrate (SC) or combination of suspoemulsion concentrate (SEC), or a soluble solution concentrate. After preparation of the treating solutions, the concentration of both copper and penflufen actives were monitored and measured over a 16-week period under ambient conditions. The results as shown in Table 8 indicate that there are minimal to negligible changes in the active concentration of copper and penflufen. The results further indicate that the combination of copper/penflufen composition disclosed in the current application is a viable formulation for treating wood.

What is claimed is:

1. A wood preservative composition for making a wood or wood product resistant to fungal decay, the wood preservative composition comprising:
   a. a copper compound, wherein the copper compound is micronized and the copper compound is basic copper carbonate; and
   b. penflufen;
   in a copper:penflufen ratio in a range of 5:1 to 200:1, wherein the wood preservative composition comprises less than 5% by weight of alkanolamines based on the total weight of the wood preservative composition.

2. The wood preservative composition of claim 1, wherein the wood preservative composition further comprises an aqueous carrier.

3. The wood preservative composition of claim 1, wherein the penflufen is micronized, solubilized, emulsified, or encapsulated.

4. The wood preservative composition of claim 1, wherein the copper compound has a particle size in a range of 5 to 5000 nanometers.

5. The wood preservative composition of claim 1, wherein the wood preservative composition comprises a concentration of penflufen configured to load the wood or the wood product with the penflufen in an amount in a range of 8 to 80 g/m³.

6. The wood preservative composition of claim 1, wherein the wood preservative composition further comprises a dispersant.

7. The wood preservative composition of claim 6, wherein the dispersant of the wood preservative composition is present in a dispersant:copper ratio in a range of 1:100 to 10:1.

8. The wood preservative composition of claim 6, wherein the dispersant comprises a salt of naphthalene sulfonate condensate, a salt of sulfonated naphthalene formaldehyde condensate, sulfonated naphthalene formaldehyde polymer admixture, or a combination thereof.

9. The wood preservative composition of claim 1, wherein at least one of a concentration of the copper compound in the wood preservative composition or a particle size of the copper compound is configured to load the wood or the wood product with the copper compound in an amount in a range of 0.0025 and 0.5 pounds copper per cubic foot of the wood or wood product.

TABLE 8

The Active Concentration of Copper and Penflufen during Storage under Ambient Conditions.

| | 0 Weeks | | 2 Weeks | | 4 Weeks | | 8 Weeks | | 16 Weeks | |
|---|---|---|---|---|---|---|---|---|---|---|
| | Cu (%) | Penflufen (%) | Cu (%) | Penflufen (%) | Cu (%) | Penflufen (%) | Cu (%) | Penflufen (%) | Cu (%) | Penflufen (%) |
| Solution #1 | 0.198 | 0.0069 | 0.200 | 0.0066 | 0.200 | 0.0065 | 0.200 | 0.0071 | 0.198 | 0.0066 |
| Solution #2 | 0.497 | 0.0177 | 0.499 | 0.0174 | 0.500 | 0.0174 | 0.505 | 0.0180 | 0.501 | 0.0173 |
| Solution #3 | 0.193 | 0.0037 | 0.194 | 0.0035 | 0.194 | 0.0035 | 0.195 | 0.0034 | 0.195 | 0.0035 |
| Solution #4 | 0.495 | 0.0097 | 0.500 | 0.0094 | 0.499 | 0.0093 | 0.497 | 0.0093 | 0.497 | 0.0094 |
| Solution #5 | 0.195 | 0.0017 | 0.196 | 0.0016 | 0.196 | 0.0015 | 0.197 | 0.0014 | 0.196 | 0.0015 |
| Solution #6 | 0.491 | 0.0046 | 0.496 | 0.0043 | 0.502 | 0.0043 | 0.499 | 0.0045 | 0.502 | 0.0045 |

10. The wood preservative composition of claim 1, wherein the wood preservative composition comprises no greater than 80% by weight of the copper compound and the penflufen.

11. The wood preservative composition of claim 1, wherein the wood preservative composition comprises a sufficient amount of aqueous carrier to form a paste, slurry, or a dispersion.

12. The wood preservative composition of claim 1, wherein the wood preservative composition comprises at least 0.193% copper by weight based on the total weight of the wood preservative composition.

13. The wood preservative composition of claim 1, wherein the wood preservative composition comprises less than 1% by weight of an alkanolamine based on the total weight of the wood preservative composition.

14. The wood preservative composition of claim 1, wherein the wood preservative composition comprises a concentration of penflufen configured to load the wood or the wood product with the penflufen in an amount in a range of 4 to 200 g/m$^3$.

15. Wood or a wood product that is resistant to fungal decay, the wood or wood product comprising a wood preservative composition, the wood preservative composition comprising:
   a. a copper compound, wherein the copper compound is micronized and the copper compound is basic copper carbonate; and
   b. penflufen;
   in a copper:penflufen ratio in a range of 5:1 to 200:1, wherein the wood or the wood product contains the penflufen in an amount in a range of 4 to 200 g/m$^3$, wherein the wood preservative composition comprises less than 5% by weight of an alkanolamine based on the total weight of the wood preservative composition.

16. The wood or wood product of claim 15, wherein the wood preservative composition comprises less than 1% by weight of an alkanolamine based on the total weight of the wood preservative composition.

17. A wood product comprising the wood preservative composition of claim 1.

18. A method for treating wood or a wood product comprising contacting the wood or wood product with the wood preservative composition of claim 1.

19. The method of claim 18, wherein the contacting comprises dipping, brushing, spraying, vacuum treatment, pressure treatment, or a combination thereof.

20. A wood product prepared by the method of claim 18.

21. A method for preparing the wood preservative composition of claim 1, the method comprising:
   milling a slurry of the copper compound and an aqueous carrier with a grinding media; and
   mixing the slurry of the copper compound with the penflufen in a copper:penflufen ratio in a range of 5:1 to 200:1 to prepare the wood preservative composition.

22. The method of claim 21, wherein the milling is performed until the copper compound has a particle size in a range of 5 to 5000 nanometers.

* * * * *